United States Patent
Kang et al.

(10) Patent No.: US 7,756,011 B2
(45) Date of Patent: Jul. 13, 2010

(54) DIGITAL TELEVISION TRANSMITTER/RECEIVER AND METHOD OF PROCESSING DATA IN DIGITAL TELEVISION TRANSMITTER/RECEIVER

(75) Inventors: Kyung Won Kang, Seoul (KR); Kook Yeon Kwak, Gyeonggi-do (KR); Ja Hyuk Koo, Seoul (KR); Kyung Wook Shin, Gyeonggi-do (KR); Yong Hak Suh, Seoul (KR); Young Jin Hong, Seoul (KR); Sung Ryong Hong, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 612 days.

(21) Appl. No.: 11/456,785

(22) Filed: Jul. 11, 2006

(65) Prior Publication Data

US 2007/0121681 A1    May 31, 2007

(30) Foreign Application Priority Data

Nov. 25, 2005    (KR) ...................... 10-2005-0113464

(51) Int. Cl.
*G01R 31/08* (2006.01)

(52) U.S. Cl. ...................... 370/216; 370/252; 714/786; 714/792

(58) Field of Classification Search ................ 370/230, 370/230.1, 232–235, 395.32, 395.4–395.43, 370/412, 414, 416, 418, 468, 216, 252; 709/238–244; 714/746, 752–756, 761, 786, 792
See application file for complete search history.

(56) References Cited

U.S. PATENT DOCUMENTS

2002/0194570 A1 * 12/2002 Birru et al. .................. 714/792

(Continued)

FOREIGN PATENT DOCUMENTS

GB        2 402 307 A    12/2004

(Continued)

OTHER PUBLICATIONS

DVB: "OVB-H Implementat ion Guide1 ines" Internet Citation, [Online] Jul. 2005. XP002376159 Retrieved from the internet : URL: http://www.dvb-h-online.                       org/PDF/Implementation%20Guidelines%20TR102377.    V1.2.1    .pdf> [retrieved on Apr. 6, 2006] * the whole document *.

(Continued)

*Primary Examiner*—Donald L Mills
(74) *Attorney, Agent, or Firm*—Lee, Hong, Degerman, Kang & Waimey

(57) ABSTRACT

A digital television (DTV) transmitter and a method of processing data in the DTV transmitter/receiver are disclosed. In the DTV transmitter, a pre-processor pre-processes the enhanced data by coding the enhanced data for forward error correction (FEC) and expanding the FEC-coded data. A packet formatter generates one or more groups of enhanced data packets, each enhanced data packet including the pre-processed enhanced data and known data, wherein the data formatter adds burst time information into each group of enhanced data packets. And, a packet multiplexer generates at least one burst of enhanced data by multiplexing the one or more groups of enhanced data packets with at least one main data packet including the main data, each burst of enhanced data including at least one group of enhanced data packets.

13 Claims, 5 Drawing Sheets

U.S. PATENT DOCUMENTS

| | | | |
|---|---|---|---|
| 2003/0152107 A1 | 8/2003 | Pekonen | |
| 2006/0159183 A1* | 7/2006 | Gaddam et al. | 375/240.26 |
| 2009/0028230 A1* | 1/2009 | Leitner | 375/224 |

FOREIGN PATENT DOCUMENTS

| | | |
|---|---|---|
| GB | 2 406 483 A | 3/2005 |
| KR | 1020010074974 | 8/2001 |
| KR | 1020010080644 | 8/2001 |
| WO | WO 2005-045603 A2 | 5/2005 |

OTHER PUBLICATIONS

Yao J et al: "IP datacasting and channel error handling with DVB-H" Emerging Information Technology Conference, 2005 NTU, Taipei, Taiwan Aug. 15-16, 2005, Piscataway, NJ, USA, IEEE, Aug. 15, 2005, pp. 61-63, XP010856441 ISBN: 0-7803-9328-7 * the whole document *.

* cited by examiner

DIGITAL TELEVISION TRANSMITTER/RECEIVER AND METHOD OF PROCESSING DATA IN DIGITAL TELEVISION TRANSMITTER/RECEIVER

This application claims the benefit of the Korean Patent Application No. 10-2005-0113464, filed on Nov. 25, 2005, which is hereby incorporated by reference as if fully set forth herein.

BACKGROUND OF THE INVENTION

1. Field of the Invention

The present invention relates to a digital communication system, and more particularly, to a digital television (DTV) transmitter/receiver and a method of processing data in the DTV transmitter/receiver. Although the present invention is suitable for a wide scope of applications, it is particularly suitable for transmitting and receiving digital broadcasts.

2. Discussion of the Related Art

Generally, the 8T-VSB transmission system adopted as a digital broadcasting standard by Korea and North America is a digital broadcast system developed for MPEG video/audio data transmission.

As the digital signal processing technology rapidly develops with the global use of Internet, the tendency for combining digital home appliances, computer and Internet together rises. So, in order to meet the user's various demands, many efforts need to be made to develop a system capable of transmitting various supplemental data with video/audio data.

A user of supplemental data broadcasting is expected to use the supplemental data broadcasting using a PC card or portable device having a simple type indoor antenna attached thereto.

Yet, signal intensity can be considerably decreased due to a shield effect of a wall and an influence of a near moving object within an indoor space and broadcast receiving performance can be reduced due to a ghost and noise generated from a reflective wave. Unlike a case of general video/audio data, a case of supplemental data transmission should have a lower error rate. In case of the video/audio data, an error failing to be detected by human eyes/ears does not matter. Yet, in case of supplemental data (e.g., a program execution file, stock information, etc.), a 1-bit error can cause a serious problem. So, the demand for developing a system more persistent against ghost and noise generated from a channel rises.

Additional data transmission will be performed by time-division through the same channel of MPEG video/audio in general. Since the beginning of digital broadcasting, ATSC VSB digital broadcast receivers receiving the MPEG video/audio only have globally spread in markets. So, the supplemental data transmitted on the same channel of the MPEG video/audio should avoid causing any effect to the conventional ATSC VSB dedicated receiver previously supplied to the markets. Such a situation is defined as ATSC VSB compatibility. And, a supplemental data broadcast system should be compatible with the ATSC VSB system. Besides, the supplemental data could be called enhanced data or E-VSB data.

However, in a poor channel environment, reception performance of the conventional ATSC VSB reception system may be reduced. Specifically, a portable or mobile receiver needs higher robustness against a channel change and noise.

SUMMARY OF THE INVENTION

Accordingly, the present invention is directed to a digital television (DTV) transmitter and a method of coding main and enhanced data in the DTV transmitter that substantially obviate one or more problems due to limitations and disadvantages of the related art.

An object of the present invention is to provide a digital television (DTV) transmitter and a method of coding main and enhanced data in the DTV transmitter, by which a new digital broadcast system suitable for supplemental data transmission and robust against noise can be provided.

Another object of the present invention is to provide a digital television (DTV) transmitter and a method of coding main and enhanced data in the DTV transmitter, by which reception performance can be enhanced by transmitting data known by a transmitting/receiving side in a manner of inserting the known data in a prescribed area of a data section.

A further object of the present invention is to provide a digital television (DTV) transmitter and a method of coding main and enhanced data in the DTV transmitter, by which various transmission parameters for a transmitted signal can be efficiently transmitted and received.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) transmitter for coding main and enhanced data includes a pre-processor for pre-processing the enhanced data by coding the enhanced data for forward error correction (FEC) and expanding the FEC-coded data, a packet formatter for generating one or more groups of enhanced data packets, each enhanced data packet including the pre-processed enhanced data and known data, wherein the data formatter adds burst time information into each group of enhanced data packets, and a packet multiplexer for generating at least one burst of enhanced data by multiplexing the one or more groups of enhanced data packets with at least one main data packet including the main data, each burst of enhanced data including at least one group of enhanced data packets.

Herein, the burst time information may indicate a time representing a total length of a current burst of enhanced data. The burst time information may indicate a time between each group of enhanced data packets included in a current burst of enhanced data and a next burst of enhanced data. The burst time information may also indicate a location of each group of enhanced data packets within a burst of enhanced data. And, the burst time information may further indicate a time between a current group of enhanced data packets and a next group of enhanced data packets within a burst of enhanced data. In addition, the data formatter may further add specific information associated with the known data into each group of enhanced data packets.

In another aspect of the present invention, a method of coding main and enhanced data in a digital television (DTV) transmitter includes pre-processing the enhanced data by coding the enhanced data for forward error correction (FEC) and expanding the FEC-coded data, generating one or more groups of enhanced data packets, each enhanced data packet including the pre-processed enhanced data and known data, generating at least one burst of enhanced data by multiplexing the one or more groups of enhanced data packets with at least one main data packet including the main data, each burst of enhanced data including at least one group of enhanced data packets, and adding burst time information into each group of enhanced data packets.

Herein, the burst time information may indicate a time representing a total length of a current burst of enhanced data. The burst time information may indicate a time between each group of enhanced data packets included in a current burst of enhanced data and a next burst of enhanced data. The burst time information may also indicate a location of each group of enhanced data packets within a burst of enhanced data. And, the burst time information may further indicate a time between a current group of enhanced data packets and a next group of enhanced data packets within a burst of enhanced data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, enhanced data can correspond to such data having information such as a program execution file, stock information and the like or may correspond to video/audio data. And, known data is the data previously known by agreement between transmitting and receiving sides. Moreover, main data is the data receivable by a conventional receiving system and includes video/audio data.

In transmitting a signal in a manner of inserting the known data already known by both of the transmitting and receiving sides in a prescribed position within an enhanced data packet, the present invention is to transmit or receive various transmission parameters associated with the transmission signal.

In particular, there exist various parameters for a signal transmitted by the E-VSB transmitting system and a receiving system has to know the transmission parameters of the transmitted signal to correctly receive the corresponding signal. For instance, information indicating how data in a symbol domain are processed by an E-VSB symbol processor to transmit an E-VSB signal is needed. And, information indicating how multiplexing is performed between main data and enhanced data or between various kinds of enhanced data. Moreover, information for a separate group, information for a burst and the like are needed as transmission parameters to transmit enhanced data packets configured with at least one of enhanced data and known data by burst unit in a manner of grouping the enhanced data packets.

The present applicant has filed a patent application for a transmitting method of grouping enhanced data packets including at least one of enhanced data and known data.

Figure 1:
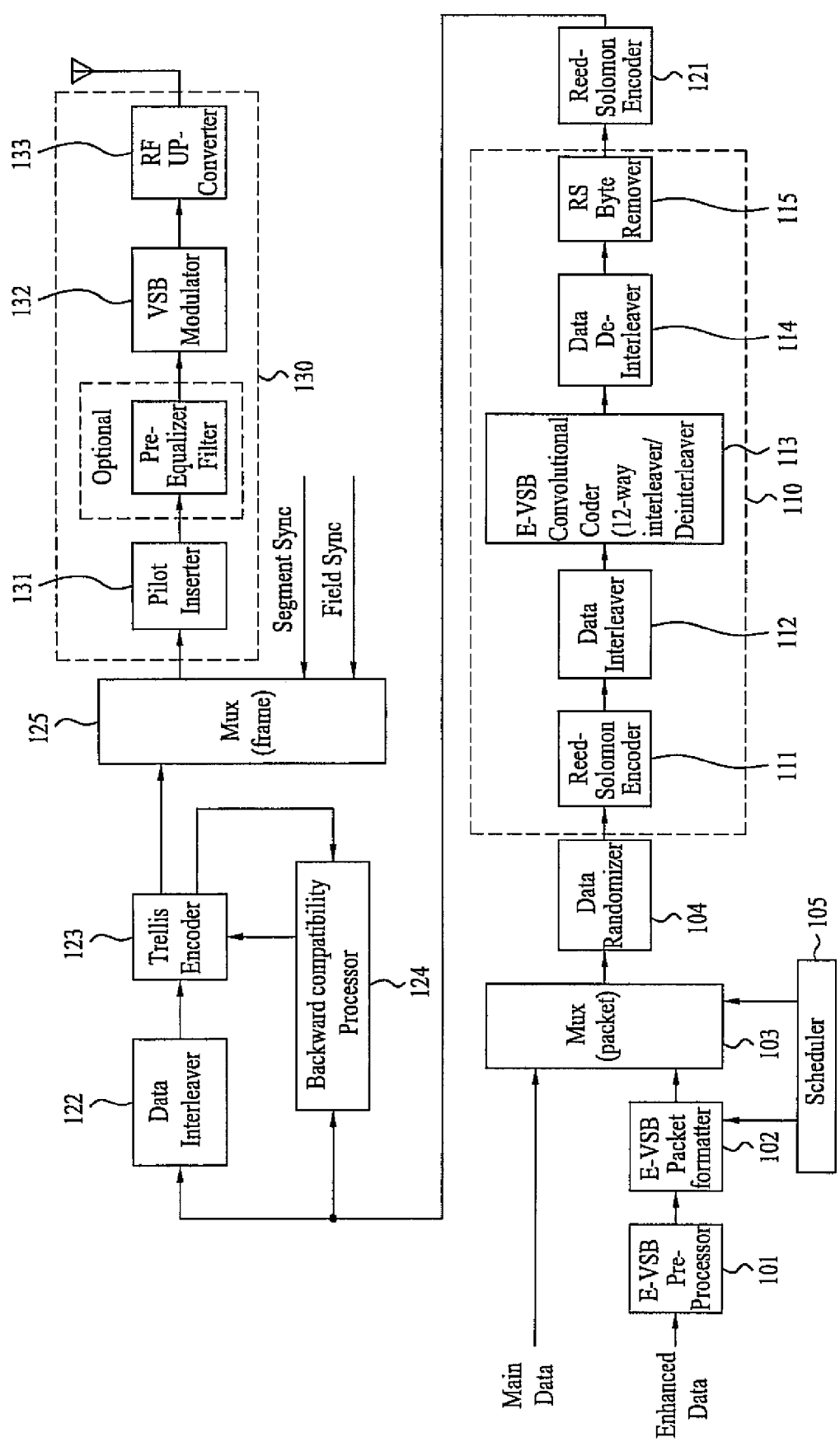
FIG. 1 is a block diagram of a digital broadcast transmitting system according to one embodiment of the present invention.
Figure 2:
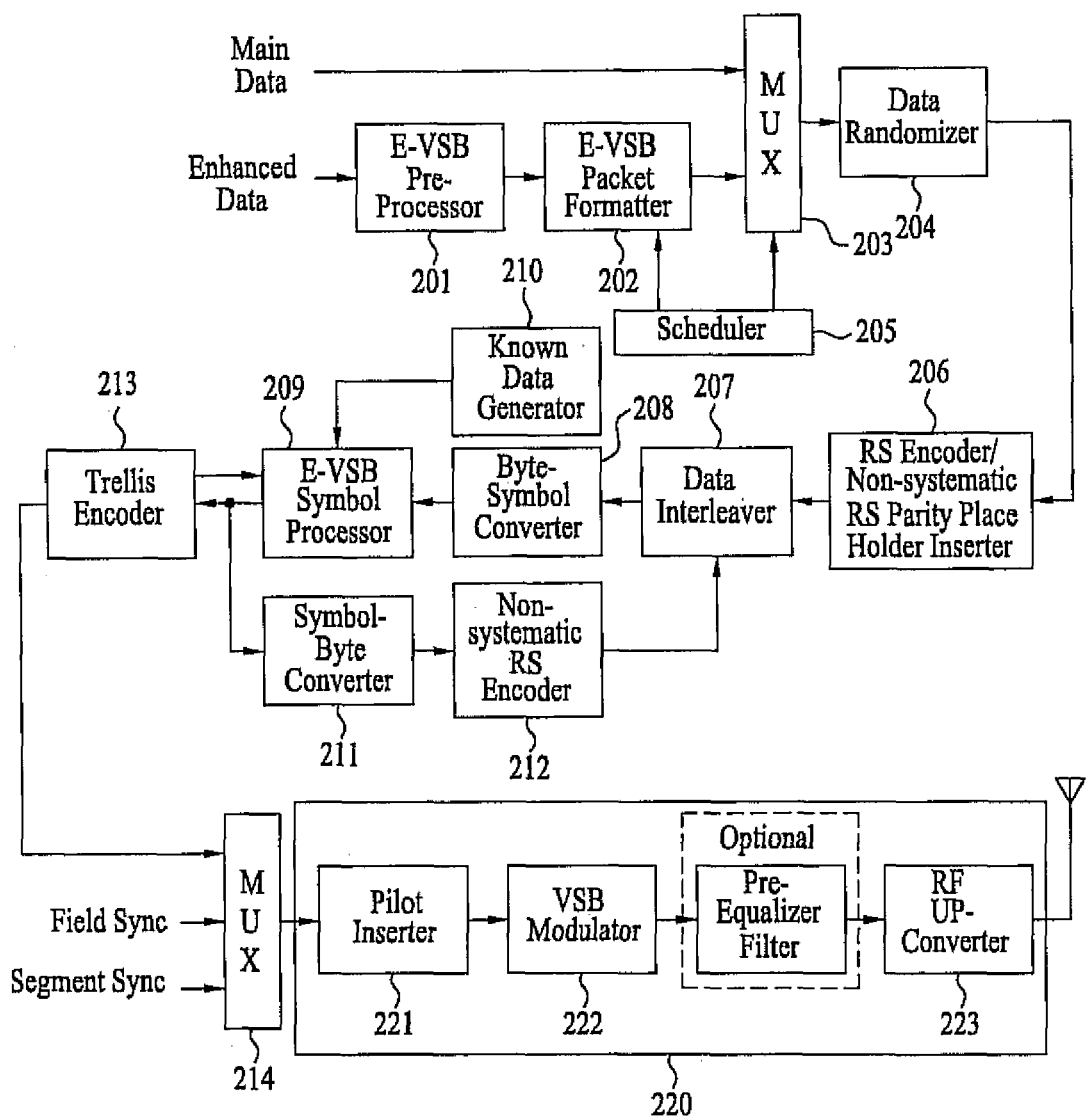
FIG. 2 is a block diagram of a digital broadcast transmitting system according to another embodiment of the present invention.

FIG. 1 is a block diagram of a digital broadcast transmitting system according to one embodiment of the present invention, and FIG. 2 is a block diagram of a digital broadcast transmitting system according to another embodiment of the present invention.

Referring to FIG. 1, a digital broadcast transmitting system according to one embodiment of the present invention includes an E-VSB pre-processor 101, an E-VSB packet formatter 102, a packet multiplexer 103, a data randomizer 104, a scheduler 105, an E-VSB post-processor 110, an RS (Read-Solomon) encoder 121, a data interleaver 122, a trellis encoder 123, a backward-compatibility processor 124, a frame multiplexer 125 and a transmitter 130.

In the above-configured transmitting system, main data is outputted to the packet multiplexer 103 by transport packet unit, whereas enhanced data is outputted to the E-VSB pre-processor 101.

The E-VSB pre-processor 101 performs pre-processing such as additional error correction encoding, interleaving, null data insertion and the like on the enhanced data and then outputs the pre-processed data to the E-VSB packet formatter 102.

The E-VSB packet formatter 102 configures a group by multiplexing the pre-processed enhanced data and previously defined known data together under the control of the scheduler 105. The E-VSB packet formatter 102 divides data within the group into 184-byte enhanced data packets, attaches a 4-byte MPEG header to a front of each of the packets and then outputs a 188-byte enhanced data packet (i.e., MPEG compatible packet), in particular, one enhanced data packet group includes a plurality of consecutive enhanced data packets.

An output of the E-VSB packet formatter 102 is inputted to the packet multiplexer 103. The packet multiplexer 103 performs time division multiplexing on the main data packet and the enhanced data packet by transport stream (TS) packet unit to output under the control of the scheduler 105.

In particular, the scheduler 105 generates a control signal enabling the packet multiplexer 103 to multiplex the main and enhanced data packets together and then outputs the control signal to the packet multiplexer 103. If so, the packet multiplexer 103 having received the control signal multiplexes the main data packet and the enhanced data packet into the TS packet unit to output.

An output of the packet multiplexer 103 is outputted to the data randomizer 104. The data randomizer 104 removes MPEG sync byte from an input packet, randomizes the rest 187 bytes using an internally generated pseudo-random byte and then outputs the randomized packet to the E-VSB post-processor 110.

The E-VSB post processor 110 includes an RS encoder 111, a data interleaver 112, a convolutional coder 113, a data deinterleaver 114 and an RS byte remover 115. Data processed by the E-VSB post-processor 110 is outputted to the frame multiplexer 125 via the RS encoder 121, the data interleaver 122 and the trellis encoder 123. In this case, the convolutional coder 113 includes a byte-to-symbol converter, an E-VSB symbol processor and a symbol-to-byte converter.

In order to make output data of the trellis encoder 123 into the known data defined by a transmitting/receiving side, initialization of a memory within the trellis encoder 123 is needed for the known data inserted in the enhanced packet. In doing so, since the initialization is achieved not by input data but by new data, RS parity should be regenerated to replace original parity data. This is performed by the compatibility processor 124.

The frame multiplexer 125 configures 832-symbol data segment by inserting four segment sync symbols in each 828 symbols of output symbols of the trellis encoder 123 and configures one data field consisting of total 313 segments by inserting one field sync segment in each 312 data segments. The frame multiplexer 125 then outputs the configured data field to the transmitter 130.

FIG. 2 is a block diagram of a digital broadcast transmitting system according to another embodiment of the present invention.

Referring to FIG. 2, a digital broadcast transmitting system according to another embodiment of the present invention includes an E-VSB pre-processor 201, an E-VSB packet formatter 202, a packet multiplexer 203, a data randomizer 204, a scheduler 205, an RS encoder & parity place holder inserter 206, a data interleaver 207, a byte-to-symbol converter 208, an E-VSB symbol processor 209, a known data generator 210, a symbol-to-byte converter 211, a non-symmetric RS encoder 212, a trellis encoder 213, a frame multiplexer 314 and a transmitter 220.

The E-VSB packet formatter 202 shown in FIG. 2 configures a group in a manner of determining a known data place holder, in which known data will be inserted within a packet, inserting null data in the determined known data place holder, and multiplexing it with output data of the E-VSB pre-processor 201. The E-VSB packet formatter 202 divides data within the group into 184-byte enhanced data packets and attaches a 4-byte MPEG header to a front of each of the packets to output a 188-byte enhanced data packet (i.e., MPEG compatible packet). So, a plurality of enhanced data packets are consecutively included in one enhanced data packet group.

An output of the E-VSB packet formatter 202 is inputted to the packet multiplexer 203. The packet multiplexer 203 performs time division multiplexing on the main data packet and the enhanced data packet into transport stream (TS) packet unit under the control of the scheduler 205.

An output of the packet multiplexer 203 is outputted to the data randomize 204. The data randomizer 204 removes MPEG sync byte from an input packet, randomizes the rest 187 bytes using an internally generated pseudo-random byte and then outputs the randomized packet to the Reed-Solomon (RS) encoder & parity place holder inserter 206.

The Reed-Solomon (RS) encoder & parity place holder inserter 206 performs systematic RS encoding or non-systematic RS parity holder insertion on the randomized data. An output of the Reed-Solomon (RS) encoder & parity place holder inserter 206 is inputted to the frame multiplexer 214 via the data interleaver 207, the byte-to-symbol converter 208, the E-VSB symbol processor 209 and the trellis encoder 213.

The frame multiplexer 214 configures 832-symbol data segment by inserting four segment sync symbols in each 828 symbols of output symbols of the trellis encoder 213 and configures one data field consisting of total 313 segments by inserting one field sync segment in each 312 data segments. The frame multiplexer 214 then outputs the configured data field to the transmitter 220.

A transmission parameter in the above-configured E-VSB transmitting system shown in FIG. 1 or FIG. 2 can be transmitted by being inserted in various places using various methods.

According to a first embodiment of the present invention, the transmission parameter can be inserted in a manner of allocating a portion of a reserved area within a field sync segment of a VSB frame. In this case, a receiving system is able to detect the transmission parameter before decoding of a received signal is performed in a symbol domain. So, a transmission parameter having information for a processing method of the E-VSB symbol processor can be inserted in the reserved area of the field sync signal. In particular, the receiving system is able to detect the transmission parameter from an agreed place after obtaining field synchronization using the field sync segment.

According to a second embodiment of the present invention, the E-VSB packet formatter is able to insert a transmission parameter by assigning a specific area as an area for the transmission parameter within a unit of group. In this case, in a receiving system, after synchronization and equalization are performed on a received signal and channel decoding (or error correction decoding) in the symbol domain is performed. An E-VSB packet de-formatter then separates enhanced data and transmission parameter to detect.

According to a third embodiment of the present invention, the transmission parameter can be multiplexed with other data symbols in a symbol domain. For instance, in multiplexing known data symbol and main or enhanced data symbol together to output to an E-VSE symbol processor, a transmission parameter symbol can be multiplexed instead of a known data symbol to be inserted in a place in which the known data symbol can be inserted.

According to a fourth embodiment of the present invention, it is able to transmit the transmission parameter by inserting the transmission parameter in a layer higher than that of a transport stream packet. In this case, a receiving system should be able to receive and decode the transmitted signal into a equal to or higher than the TS packet layer. For this, the transmission parameter plays a role as verification for a transmission parameter of a currently received signal and a role in giving a transmission parameter of a signal to be received later.

In the present invention, various transmission parameters for a transmission signal are transmitted by being inserted by the aforesaid methods according to the embodiments of the present invention. In this case, the transmission parameters can be inserted to be transmitted according to one of the embodiments only, a portion of the embodiments or the entire embodiments. And, information within the transmission parameter can be overlapped to be inserted in each of the embodiments or necessary information can be inserted in a corresponding place to be transmitted according to the corresponding embodiment.

In case that information for a processing method of the E-VSB symbol processor shown in FIG. 1 or FIG. 2 is transmitted as a portion of a transmission parameter, a receiving system is able to perform decoding corresponding to the E-VSB symbol processor only if knowing the information for the symbol processing method. So, the information for the processing method of the E-VSB symbol processor should be known prior to the symbol-domain decoding.

In this case, it is able to transmit a transmission parameter having information for the processing method of the E-VSB symbol processor according to the first embodiment by inserting the transmission parameter in a reserved area of the field sync signal. This is because the transmission parameter can be detected before the symbol-domain decoding for a received signal is performed in a receiving system.

It is able to transmit the transmission parameter by inserting the transmission parameter having information for the processing method of the E-VSB symbol processor according to the third embodiment. In this case, since a symbol processing method for a transmission parameter symbol itself and a place of the transmission parameter symbol are determined in advance, the transmission symbol parameter should be placed to be transmitted/received in advance of other data to be decoded. If so, a receiving system is able to use the transmission parameter symbol for the decoding of the data symbol by detecting the transmission parameter symbol prior to the data symbol decoding.

Meanwhile, in case that information for the processing method of the E-VSB symbol processor in a transmission parameter inserted in a layer equal to or higher than a TS packet layer and a transmission parameter inserted by the E-VSB packet formatter according to the second or fourth embodiment, detection is possible after completion of decoding in a symbol domain. So, it is unable to use the information for current symbol decoding. Instead, the information can be used in confirming information for a processing method of a current E-VSB symbol processor or as information for a processing method of the E-VSB symbol processor of a next group or burst.

The first to fourth embodiments of the present invention are explained in detail with reference to the attached drawings as follows.

First Embodiment

Case of Inserting Transmission Parameter in Field Sync Segment Area

Figure 3:
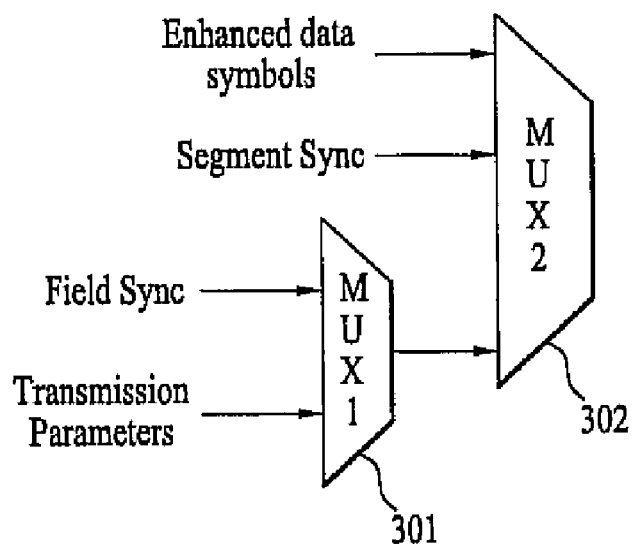
FIG. 3 is a detailed block diagram of a frame multiplexer according to one embodiment of the present invention to transmit a transmission parameter by inserting the transmission parameter in a field sync segment.

FIG. 3 is a detailed block diagram of the frame multiplexer (125 or 214) shown in FIG. 1 or FIG. 2 according to one embodiment of the present invention to transmit a transmission parameter by inserting the transmission parameter in a field sync segment.

Referring to FIG. 3, the frame multiplexer includes a first multiplexer 301 multiplexing a field sync signal and a transmission parameter and a second multiplexer 302 multiplexing an E-VSB data symbol, a segment sync signal and an output of the first multiplexer 301 to output.

A VSB frame generally consists of two fields and each of the fields consists of one field sync segment and 312 data segments. Each of the data segments consists of total 832 symbols. In this case, first four symbols of one data segment corresponds a segment sync part and a first segment of one field corresponds to a field sync part.

One field sync signal consists of one segment length. A data segment sync pattern exists in first four symbols, a pseudo-random sequence of PN 511, PN 63, PN 63 and PN 63 exists next to the data segment sync pattern, and VSB mode associated information exists in the next 24 symbols. The rest 104 symbols next to the 24 symbols of the VSB mode associated information are reserved. Last 12 symbol data of a previous segment are copied into last 12 symbols of the reserved area. If so, 92 symbols of the field sync segment practically become a reserved area.

The first multiplexer 301 multiplexes the transmission parameter with a field sync segment symbol to insert the transmission parameter to be inserted in the reserved area of the field sync segment and then outputs the multiplexed signal to the second multiplexer 302.

The second multiplexer 302 configures a new VSB frame by multiplexing a segment sync symbol, data symbols and a new field sync segment outputted from the first multiplexer 301 together. A transmission frame including the field sync segment having the E-VSB transmission parameter inserted therein is inputted to a transmitter.

In this case, the reserved area within the field sync segment for inserting the transmission parameter can be a portion or whole part of the reserved area of the 92 symbols or a portion or whole part of an area except 64 symbols used for an enhanced mode map among the 92-symbol reserved area.

The transmission parameter inserted in the reserved area can include information for discriminating a signal of a general 8-VSB transmission mode, a signal of an enhanced VSB transmission mode or a signal of another kind of enhanced VSB transmission mode for example.

Second Embodiment

Case of Inserting Transmission Parameter in E-VSB Packet Formatter

Figure 4:
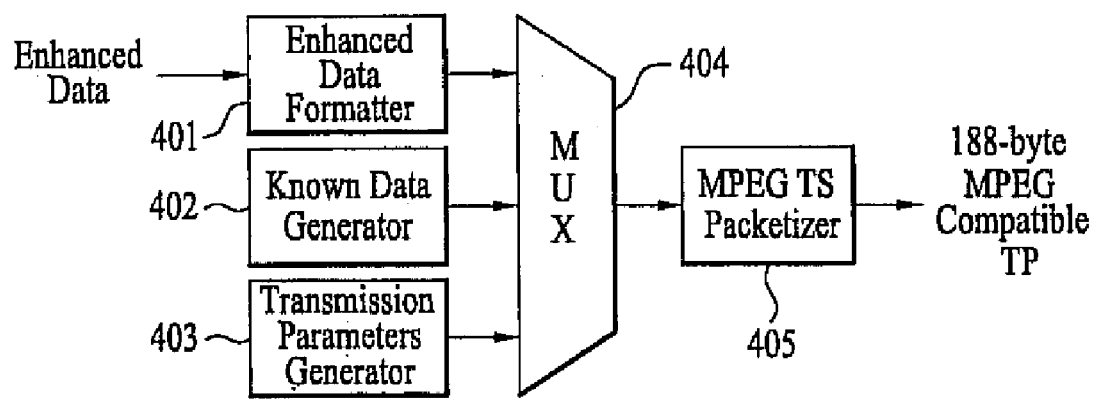
FIG. 4 is a detailed block diagram of an E-VSB packet formatter according to one embodiment of the present invention to transmit a transmission parameter by inserting the transmission parameter in a group.

FIG. 4 is a detailed block diagram of the E-VSB packet formatter (102, 202) shown in FIG. 1 or FIG. 2 according to one embodiment of the present invention to transmit a transmission parameter by inserting the transmission parameter in a group.

Referring to FIG. 4, the E-VSB packet formatter includes an enhanced data formatter 401, a know data generator 402, a transmission parameter generator 403, a multiplexer 404 and an MPEG TS packetizer 405.

If enhanced data is inputted from the E-VSB pre-processor, the enhanced data formatter 401 aligns the enhanced data within a group and then outputs the aligned data to the multiplexer 404.

And, the known data generator 402 generates known data and then outputs the generated data to the multiplexer 404 as well.

If the E-VSB packet formatter is applied to FIG. 1, the known data generator 402 is able to practical known data or a known data place holder. If the E-VSB packet formatter is applied to FIG. 2, the known data generator 402 is able to output a known data place holder in which null data is inserted.

And, the transmission parameter generator 403 generates a transmission parameter associated with a group or burst and then outputs the generated parameter to the multiplexer 404. In particular, the transmission parameter can include information for a length of a current burst, information indicating a timing point of a next burst, a place and length where groups exists within burst, a time to a next group from a current group within burst, information for known data and the like.

The multiplexer 404 configures a group by multiplexing the enhanced data outputted from the enhanced data formatter 401, the known data (or known data place holder) outputted from the known data generator 402 and the transmission parameter outputted from the transmission parameter generator 403 together.

An output of the multiplexer 404 is inputted to the MPEG TS packetizer 405.

The MPEG TS packetizer 405 divides data within a group into 184-byte enhanced data packets, attaches a 4-byte MPEG header to a front of each of the packets and then outputs a 188-byte enhanced data packet (i.e., MPEG TS compatible packet).

In this case, an E-VSB packet de-formatter of a receiving system can separate to detect the transmission parameters and enhanced data from each other.

Third Embodiment

Case of Inserting Transmission Parameter in Symbol Domain

Figure 5:
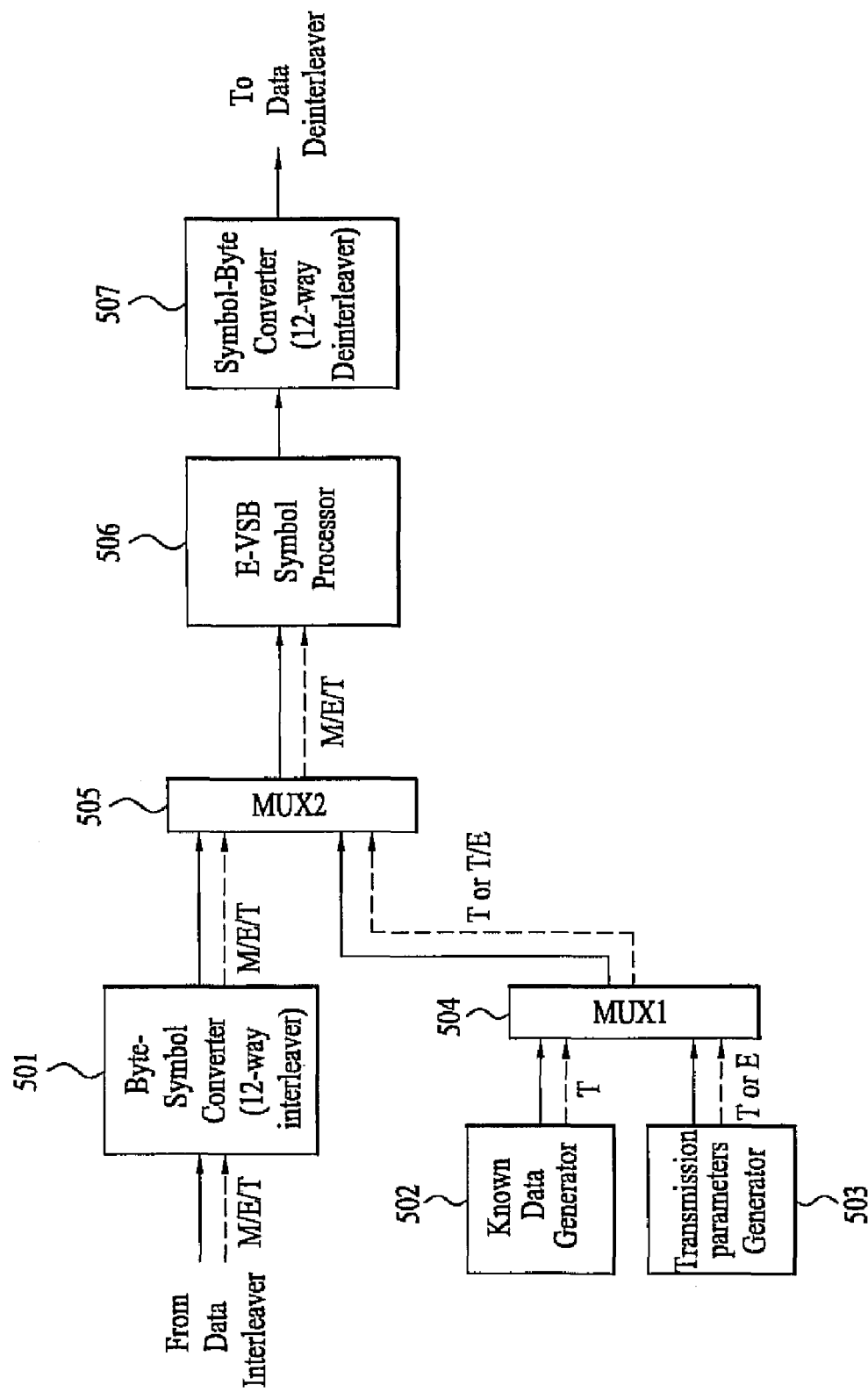
FIG. 5 is a detailed block diagram of a convolutional coder of the transmitting system shown in FIG. 1 according to one embodiment of the present invention to transmit a transmission parameter by multiplexing the transmission parameter in a symbol domain.

FIG. 5 is a detailed block diagram of the convolutional coder (113) of the transmitting system shown in FIG. 1 according to one embodiment of the present invention to transmit a transmission parameter by multiplexing the transmission parameter with a data symbol and known data in a symbol domain.

Referring to FIG. 5, the convolutional coder includes a byte-to-symbol converter or 12-way interleaver 501, a known data generator 502, a transmission data generator 503, a first multiplexer 504, a second multiplexer 505, an E-VSB symbol processor 506 and a symbol-to-byte converter or 12-way deinterleaver 507.

In this case, the E-VSB packet formatter shown in FIG. 1 determines a known data place holder in which known data will be inserted, inserts null data in the determined data place holder and then multiplexes it with enhanced data pre-processed by the E-VSB pre-processor, for example.

The byte-to-symbol converter 501 converts an output byte of the data interleaver to a symbol to output. In this case, the data byte outputted from the data interleaver corresponds to one of main data, enhanced data and known data (or known data place holder). One byte is converted to four symbols. And, each of the symbols consists of two bits.

Each of the symbols is able to have an attribute indicating whether its symbol corresponds to the main data, the enhanced data or the known data place holder.

In FIG. 5, a solid line indicates a data flow and a dotted line indicates an attribute of each data. In particular, 'M' indicates a main data attribute, 'E' indicates an enhanced data attribute and 'T' indicates a known data attribute.

The known data generator 502 simultaneously outputs a known data symbol and known data attribute information indicating the known data.

The transmission parameter generator 503 simultaneously outputs a transmission parameter symbol and its attribute information. In this case, the attribute information can be outputted as an attribute of the known or enhanced data.

The first multiplexer 504 multiplexes the known data symbol outputted from the known data generator 502 and the transmission parameter symbol outputted from the transmission parameter generator 503 together and then outputs the multiplexed symbol to the second multiplexer 505 together with the corresponding attribute information.

The second multiplexer 505 selects an output symbol of the byte-to-symbol converter 501 or an output symbol of the first multiplexer 504 according to an attribute of the symbol outputted from the byte-to-symbol converter 501 and then outputs the selected symbol to the E-VSB symbol processor 506 together with its attribute information.

In particular, if the attribute of the symbol outputted from the byte-to-symbol converter 501 corresponds to the main or enhanced data attribute, the second multiplexer 505 selects the symbol outputted from the byte-to-symbol converter 501 and the attribute information of the corresponding symbol and then outputs them to the E-VSB symbol processor 506. If the attribute of the symbol outputted from the byte-to-symbol converter 501 is the attribute of the known data (or known data place holder), the second multiplexer 505 selects the symbol outputted from the first multiplexer 504 and the attribute information of the corresponding symbol and then outputs them to the E-VSB symbol processor 506.

Hence, if the data symbol outputted from the second multiplexer 505 is the main data symbol, the symbol has the attribute of main data. If the data symbol outputted from the second multiplexer 505 is the enhanced data symbol, the symbol has the attribute of enhanced data. Yet, in case of the transmission parameter symbol, the symbol can have the symbol attribute outputted from the transmission parameter generator 503, i.e., the attribute of the known or enhanced data.

The E-VSB symbol processor 506 performs a symbol processing process on the symbol having the attribute of enhanced data. For instance, additional encoding of ½ coding rate can be performed on the symbol having the attribute of enhanced data.

The E-VSB symbol processor 506 does not perform additional encoding on the symbol having the attribute of main or known data.

Even if the MPEG header byte inserted in the enhanced data packet by the E-VSB packet formatter or the RS parity byte attached to the enhanced data packet by the RS encoder is converted to a symbol, the E-VSB symbol processor 506 outputs the symbol like the main data without changing the data. This is because the symbol has the attribute of main data.

In case that the transmission parameter symbol has the attribute of known data, the E-VSB symbol processor 506 processes to output the corresponding symbol in the same manner of the known data. In case that the transmission parameter symbol has the attribute of enhanced data, the E-VSB symbol processor 506 is able to process to output the corresponding symbol in the same manner of the enhanced data. In particular, the transmission parameter symbol having the attribute of known data does not go through additional encoding and the transmission parameter symbol having the attribute of enhanced data can go through additional encoding at ½ coding rate.

In other words, if the transmission parameter symbol has the attribute of known data, it is processed via the same path of the known data by the E-VSB symbol processor 506. So, additional encoding is not performed in the symbol domain for the transmission parameter symbol. But, additional encoding is performed in the symbol domain if the transmission parameter symbol has the attribute of enhanced data.

An output symbol of the E-VSB symbol processor 506 is converted to a byte by the symbol-to-byte converter 507 and is then outputted to the data de-interleaver. The byte-to-symbol converter 501 is identical to a byte-to-symbol converter of the trellis encoder. And, the symbol-to-byte converter 507 has a process reverse to that of the byte-to-symbol converter.

Figure 6:
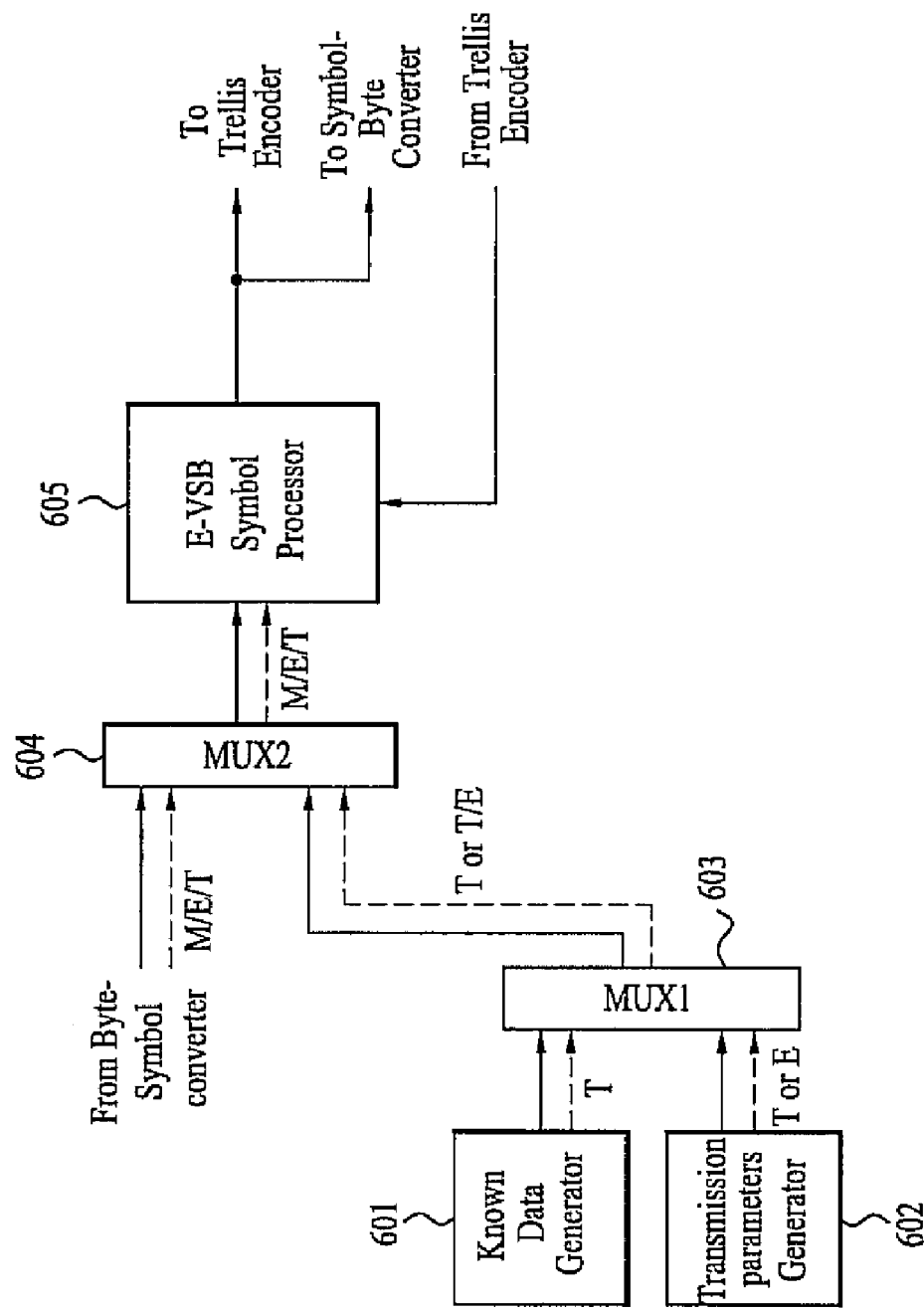
FIG. 6 is a detailed block diagram of a part relating to an E-VSB symbol processor of the transmitting system shown in FIG. 2 according to one embodiment of the present invention to transmit a transmission parameter by multiplexing the transmission parameter in a symbol domain.

FIG. 6 is a detailed block diagram of a part relating to an E-VSB symbol processor of the transmitting system shown in FIG. 2 according to one embodiment of the present invention to transmit a transmission parameter by multiplexing the transmission parameter in a symbol area.

Referring to FIG. 2, a part relating to an E-VSB symbol processor of the transmitting system shown in FIG. 2 according to one embodiment of the present invention includes a known data generator 601, a transmission parameter generator 602, a first multiplexer 603, a second multiplexer 604 and an E-VSB symbol processor 605.

The known data generator 601 has the same block of the known data generator 210 shown in FIG. 2.

Each of the symbols outputted from the byte-to-symbol converter is able to have an attribute indicating whether its symbol corresponds to the main data, the enhanced data or the known data place holder.

In FIG. 6, a solid line indicates a data flow and a dotted line indicates an attribute of each data. In particular, 'M' indicates a main data attribute, 'E' indicates an enhanced data attribute and 'T' indicates a known data attribute.

The known data generator 601 simultaneously outputs a known data symbol and known data attribute information indicating the known data.

The transmission parameter generator 602 simultaneously outputs a transmission parameter symbol and its attribute information. In this case, the attribute information can be outputted as an attribute of the known or enhanced data.

The first multiplexer 603 multiplexes the known data symbol outputted from the known data generator 601 and the transmission parameter symbol outputted from the transmission parameter generator 602 together and then outputs the multiplexed symbol to the second multiplexer 604 together with the corresponding attribute information.

The second multiplexer 604 selects an output symbol of the byte-to-symbol converter or an output symbol of the first multiplexer 603 according to an attribute of the symbol outputted from the byte-to-symbol converter and then outputs the selected symbol to the E-VSB symbol processor 605 together with its attribute information.

In particular, if the attribute of the symbol outputted from the byte-to-symbol converter corresponds to the main or enhanced data attribute, the second multiplexer 604 selects the symbol outputted from the byte-to-symbol converter and the attribute information of the corresponding symbol and then outputs them to the E-VSB symbol processor 605. If the attribute of the symbol outputted from the byte-to-symbol converter is the attribute of the known data (or known data place holder), the second multiplexer 604 selects the symbol outputted from the first multiplexer 603 and the attribute information of the corresponding symbol and then outputs them to the E-VSB symbol processor 605.

The E-VSB symbol processor 605 performs additional encoding of ½ coding rate on the inputted symbol having the attribute of enhanced data. The E-VSB symbol processor 605 does not perform additional encoding on the inputted symbol having the attribute of main or known data.

Even if the MPEG header byte inserted in the enhanced data packet by the E-VSB packet formatter or the RS parity byte attached to the enhanced data packet by the RS encoder is converted to a symbol, the E-VSB symbol processor 605 outputs the symbol like the main data without changing the data.

In case that the transmission parameter symbol has the attribute of known data, additional encoding is not performed like the known data. In case that the transmission parameter symbol has the attribute of enhanced data, additional encoding is performed at ½ coding rate like the enhanced data.

And, the E-VSB symbol processor 605 generates to output a data symbol enabling a memory of a trellis encoder to be reset to a predetermined value at a portion where a sequence of known data symbols starts. For this, a memory value in the trellis encoder is inputted to the E-VSB symbol processor 605.

The trellis encoder is reset when the sequence of the known data starts. This is because various output sequences are possible according to the memory state of the trellis encoder even if the known data sequence is inputted to the trellis encoder.

Hence, after the memory state of the trellis encoder has been reset to the predetermined value, if the known data is inputted, it is able to obtain the known data sequence from an output of the trellis encoder as well.

An output symbol of the E-VSB symbol processor 605 is outputted to the trellis encoder and the symbol-to-byte converter.

Thus, in the present invention, a transmission parameter can be transmitted by being inserted in a reserved area of a field sync segment of a VSB frame and/or a predetermined place of a group.

And, the transmission parameter can be transmitted by being multiplexed with other data symbols in a symbol domain.

Moreover, the transmission parameter can be transmitted by being inserted in a layer higher than a transport stream packet.

Accordingly, the present invention provides the following effects or advantages.

First of all, the present invention is strong against error in transmitting supplemental data via a channel. And, the present invention is compatible with a conventional VSB receiver. Moreover, the present invention enables an errorless reception of supplemental data on a channel having ghost and noise worse than those of the related art VSB system.

Secondly, the present invention transmits known data inserted in a specific place of a data area, thereby enhancing reception performance of a receiving system having considerable channel variations.

In particular, the present invention transmits transmission parameters associated with a transmission signal by various places and methods, thereby being applicable to data demodulation and decoding in a manner of extracting the transmission parameters efficiently in a receiving system.

Finally, the present invention is effectively applicable to a portable or mobile receiver requiring robustness against noise with considerable channel variations.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital television (DTV) transmitter for coding main and enhanced data, the DTV transmitter comprising:
   a pre-processor for pre-processing the enhanced data by coding the enhanced data for forward error correction (FEC) and expanding the FEC-coded data;
   a data formatter for generating one or more groups of enhanced data packets, at least one enhanced data packet including the pre-processed enhanced data and known data, which is known by transmitting and receiving sides in advance, wherein the data formatter adds a transmission parameter including group information into each of the one or more groups of enhanced data packets, the group information not known by the receiving side until the transmission parameter is transmitted by the transmitting side;

a packet multiplexer for multiplexing the one or more groups of enhanced data packets with at least one main data packet including the main data; and a trellis encoder, having at least one memory, for trellis-encoding the multiplexed one or more groups of enhanced data packets and the at least one main data packet, wherein the trellis encoder initializes the at least one memory at a position where the known data starts.

2. The DTV transmitter of claim 1, further comprising a scheduler for generating first and second control signals to control operations of the data formatter and the packet multiplexer.

3. The DTV transmitter of claim 1, wherein the data formatter further adds specific information associated with the known data into each of the one or more groups of enhanced data packets.

4. The DTV transmitter of claim 1, wherein the data formatter comprises:

a known data generator for generating the known data;

a transmission parameter generator for generating the transmission parameter including the group information; and a multiplexer for generating each of the one or more groups of enhanced data packets by multiplexing the enhanced data, the known data generated from the known data generator, and the transmission parameter generated by the transmission parameter generator.

5. The DTV transmitter of claim 1, further comprising:

a data randomizer for randomizing the data packets multiplexed from the packet multiplexer;

an RS encoder for RS-coding the randomized data packets by adding first parity data; and a data interleaver for interleaving the RS-coded data packets.

6. A method of coding main and enhanced data in a digital television (DTV) transmitter, the method comprising:

pre-processing the enhanced data by coding the enhanced data for forward error correction (FEC) and expanding the FEC-coded data;

generating one or more groups of enhanced data packets, at least one enhanced data packet including the pre-processed enhanced data and known data, which is known by transmitting and receiving sides in advance;

adding a transmission parameter including group information into each of the one or more groups of enhanced data packets, the group information not known by the receiving side until the transmission parameter is transmitted by the transmitting side;

multiplexing the one or more groups of enhanced data packets with at least one main data packet including the main data;

trellis-encoding the multiplexed one or more groups of enhanced data packets and the at least one main data packet using at least one memory included in a trellis encoder; and initializing the at least one memory at a position where the known data starts.

7. The method of claim 6, further comprising generating first and second control signals to control the generation of the one or more groups of enhanced data packets.

8. The method of claim 6, further comprising adding specific information associated with the known data into each of the one or more groups of enhanced data packets.

9. The method of claim 6, wherein generating the one or more groups of enhanced data packets comprises:

generating the known data;

generating the transmission parameter including the group information; and generating each of the one or more groups of enhanced data packets by multiplexing the enhanced data, the known data, and the transmission parameter.

10. The method of claim 6, further comprising:

randomizing the multiplexed enhanced and main data packets;

RS-coding the randomized data packets by adding first parity data; and interleaving the RS-coded data packets.

11. A method for processing a digital television (DTV) broadcasting signal in a broadcasting receiver, the method comprising:

receiving the DTV broadcasting signal from a broadcasting transmitter, wherein the DTV broadcasting signal, which comprises known data that is used for improving reception performance of the enhanced data, the known data known by the broadcasting transmitter and the broadcasting receiver, is generated from the broadcasting transmitter by interleaving a signal which comprises symbol-encoded enhanced data and a transmission parameter that comprises encoding-related information, initializing at least one memory included in a trellis encoder at a position where the known data starts, and performing trellis-encoding on the known data depending upon the initialized at least one memory;

detecting the encoding-related information from the transmission parameter; and symbol-decoding the enhanced data included in the received DTV broadcasting signal based on the detected encoding-related information.

12. The method of claim 11, wherein the transmission parameter further comprises information related to time-slicing.

13. The method of claim 11, wherein the received DTV broadcasting signal comprises main data which bypasses the symbol-encoding by the broadcasting transmitter.

* * * * *